No. 718,810. PATENTED JAN. 20, 1903.
J. H. BAKER.
APPARATUS FOR MAKING CHAINS.
APPLICATION FILED FEB. 3, 1902.
NO MODEL. 2 SHEETS—SHEET 1.
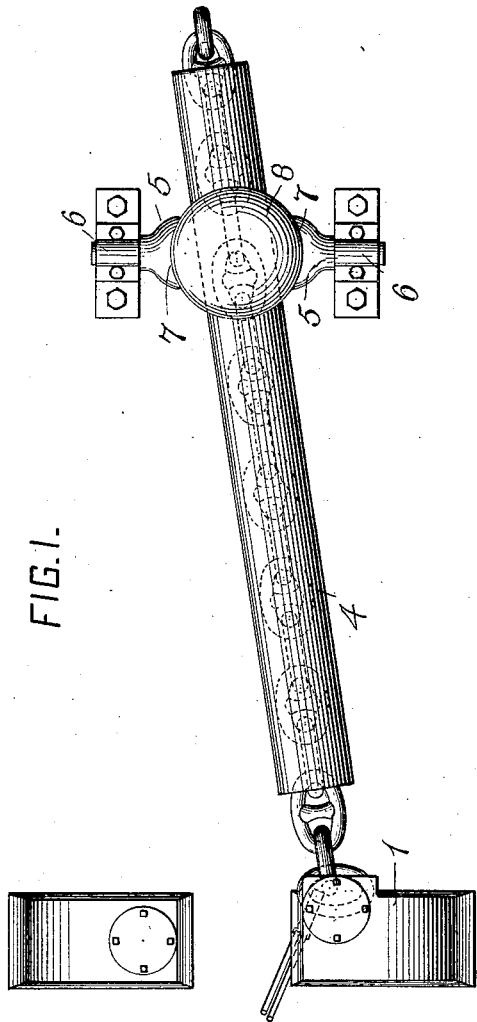
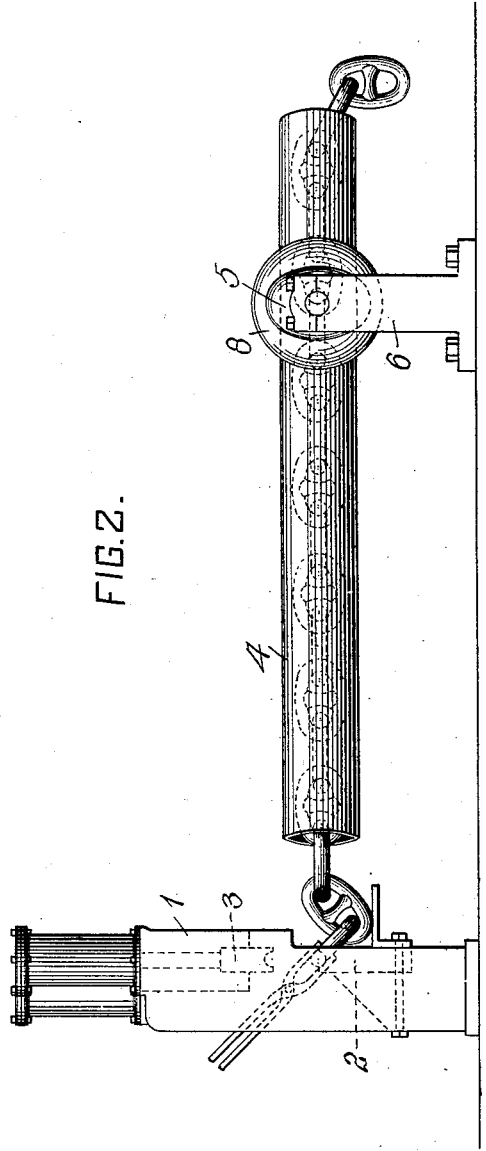

No. 718,810. PATENTED JAN. 20, 1903.
J. H. BAKER.
APPARATUS FOR MAKING CHAINS.
APPLICATION FILED FEB. 3, 1902.
NO MODEL. 2 SHEETS—SHEET 2.
FIG.3.
FIG.4.
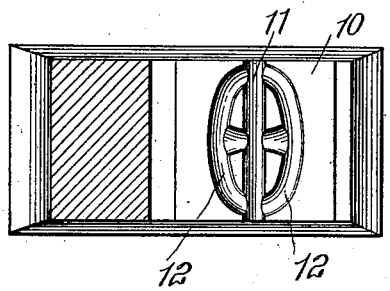
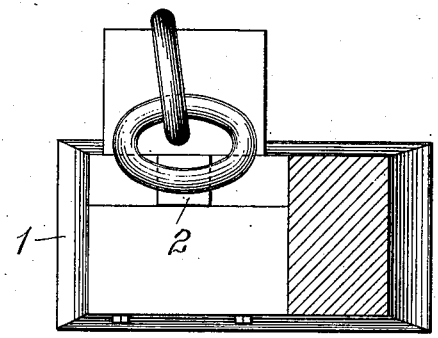
FIG.5.
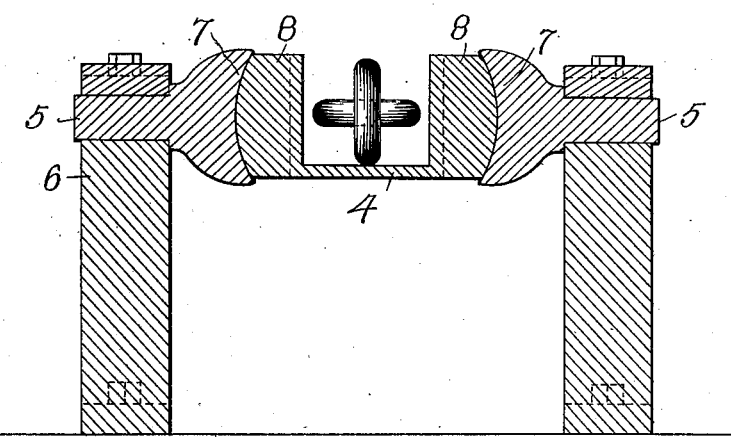
WITNESSES:
Herbert Bradley.
Fred Kirchner.
INVENTOR
James H. Baker
by Damon S. Wolcott Att'y.

UNITED STATES PATENT OFFICE.

JAMES H. BAKER, OF ALLEGHENY, PENNSYLVANIA, ASSIGNOR TO JAS. H. BAKER MANUFACTURING COMPANY, OF ALLEGHENY, PENNSYLVANIA, A CORPORATION OF PENNSYLVANIA.

APPARATUS FOR MAKING CHAINS.

SPECIFICATION forming part of Letters Patent No. 718,810, dated January 20, 1903.

Application filed February 3, 1902. Serial No. 92,410. (No model.)

*To all whom it may concern:*

Be it known that I, JAMES H. BAKER, a citizen of the United States, residing at Allegheny, in the county of Allegheny and State of Pennsylvania, have invented or discovered certain new and useful Improvements in Apparatus for Manufacturing Chains, of which improvements the following is a specification.

The invention described herein relates to certain improvements in apparatus for making chains, and has for its object the provision of suitable means for supporting the portions of chain adjacent to the welding-hammer in such manner as to facilitate the necessary shifting of the link being welded. The invention is hereinafter more fully described and claimed.

In the accompanying drawings, forming a part of this specification, Figure 1 is a plan view of my improved apparatus for welding links. Fig. 2 is a side elevation of the apparatus. Figs. 3 and 4 are sectional plans of the welding and shaping dies, respectively; and Fig. 5 shows an alternative form of trough.

In the practice of my invention a chain-support is arranged in suitable relation to the welding hammer or press 1, which may be of any desired or suitable construction, having suitably-shaped anvil and hammer dies 2 and 3. These dies are preferably made narrow, so that the area of impact on the link will be small. The chain-support consists of a holding or supporting bed 4 for the chain made in the form of a tube arranged with one end in close proximity to the welding-hammer. This trough or tube is supported in such manner as to permit of its being swung in any direction and also rotated on its axis. A convenient form of support for this purpose consists of arms or trunnions 5, mounted in suitable bearings 6 and provided at their inner ends with concave seats 7 for the reception of the spherical block 8, carrying the trough or tube 4. As the chain is formed it is drawn into the tube or trough, and by shifting and rotating the latter the link being welded can be placed in any desired position for welding or shaping without any great exertion by the operator. As shown in Fig. 5, the supporting plate or bed can be made in the form of a flat-bottomed trough.

In making large chains wherein transverse studs are employed to prevent the sides of the link from collapsing an auxiliary hammer or press 9 is employed for pressing the sides of the link against the ends of the studs and for straightening the link. Such hammers are generally placed in close proximity to the weld-hammer, so that a link can be shifted as soon as welded to the other hammer. By locating the chain-support on or approximately on a line passing midway between the hammers, as shown, the chain can be shifted with the link just welded from one hammer to the other and back again.

By reference to Fig. 4 it will be seen that the dies 10 (both dies being similar) are provided with grooves 11, in which the link is placed vertically, so that the sides can be pressed against the ends of the stud. After the stud has been secured in position the link is placed in a horizontal position in the grooves 12 and subjected to blows or pressure sufficient to remove all twist or other irregularity in shape.

I claim herein as my invention—

1. In an apparatus for manufacturing chains a welding mechanism in combination with a chain holding or supporting bed, a support for the bed, and a universal joint connecting the tube and support, substantially as set forth.

2. In an apparatus for manufacturing chains, a welding mechanism, a supporting-bed having a spherical bearing portion and bed-supporting arms provided with concave seats for the spherical bearing portions, substantially as set forth.

In testimony whereof I have hereunto set my hand.

JAMES H. BAKER.

Witnesses:
DARWIN S. WOLCOTT,
F. E. GAITHER.